March 9, 1965 W. L. BRYANT 3,172,452
U-BOLT BENDER
Filed Sept. 26, 1960 2 Sheets-Sheet 1
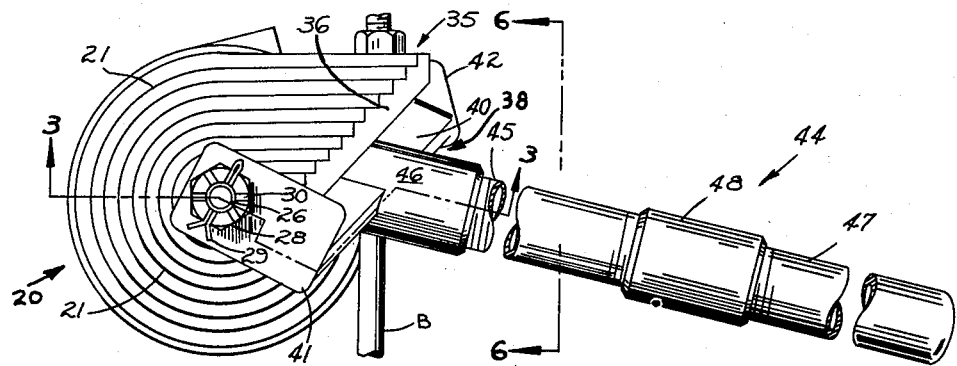
FIG. 1
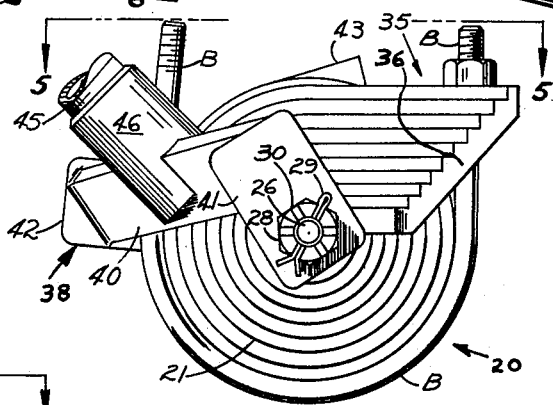
FIG. 2
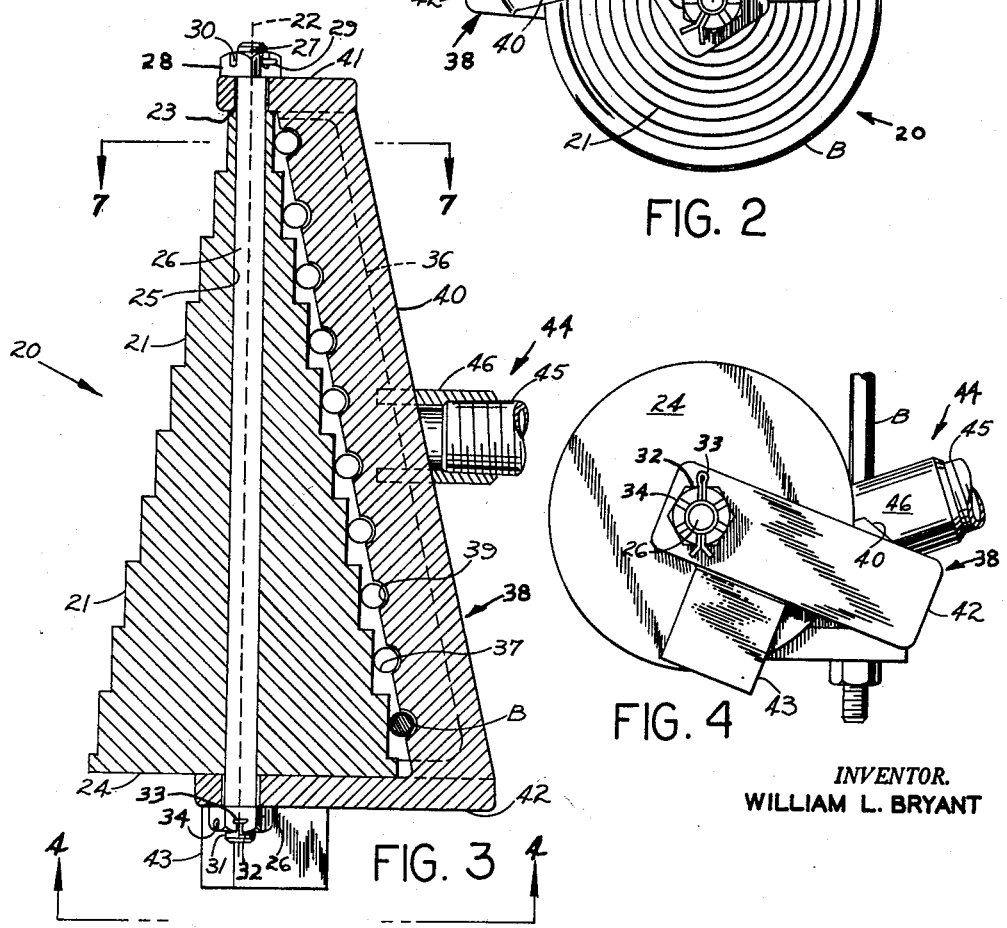
FIG. 3
FIG. 4
INVENTOR.
WILLIAM L. BRYANT March 9, 1965  W. L. BRYANT  3,172,452
U-BOLT BENDER Filed Sept. 26, 1960  2 Sheets-Sheet 2

INVENTOR.
WILLIAM L. BRYANT

3,172,452
U-BOLT BENDER
William L. Bryant, Morro Bay, Calif., assignor of one-fourth to R. W. Hodgson, Los Angeles, Calif.
Filed Sept. 26, 1960, Ser. No. 58,369
9 Claims. (Cl. 153—46)

The preesnt invention consists of apparatus adapted to bend one or more pieces of metal rod (pre-threaded or not) into substantially U-shaped configuration whereby to form one or more U-bolts of desired radius of curvature and desired bolt diameter.

While it is true that pre-manufactured U-bolts can be purchased in a variety of sizes, it, nevertheless. frequently becomes necessary, while workmen are actually engaged in performing some mechanical work, to actually make a U-bolt to desired specifications, since no pre-manufactured U-bolt may be available at the time. In prior art practice, whenever this has been necessary, it has been a costly and time-consuming operation, usually performed by welding a nut to some object which can be firmly held in a fixed position such as a vise, or the like, threading one end of the rod stock from which the U-bolt is to be made, into said nut, threading the opposite end of the rod stock from which the U-bolt is to be formed, into another nut which has been welded to a longitudinal lever member so that great force can be applied to the rod stock to bend it around a pipe having an exterior diameter corresponding to the desired interior diameter of the U-bolt when finished. This type of prior art practice in the forming of a U-bolt from rod stock wastes man hours of labor and results in excessive cost. On the other hand, the novel U-bolt bender of the present invention can quickly and easily, in a matter of a few seconds, form from various sizes of rod stock (threaded or otherwise) a large number of sizes of U-bolts—and with an absolute minimum of labor and cost.

It is an object of the present invention to provide a U-bolt bender of the character referred to above adapted to bend one or more pieces of rod stock into any of a number of different sizes of U-bolts, and which is of extremely simple, cheap, foolproof construction such as to be conducive to widespread use of the device.

Further objects are implicit in the detailed description which follows hereinafter and will be apparent to persons skilled in the art after a careful study thereof.

For the purpose of clarifying the nature of the present invention, two exemplary embodiments are illusttrated in the hereinbelow-described figures of the accompanying drawings and are described in detail hereinafter.

FIG. 1 is a fragmentary top plan view of one exemplary embodiment of the present invention in initial or starting position at the beginning of a bending operation to bend a piece of rod stock (shown fragmentarily for space conservation reasons) into a U-bolt.

FIG. 2 is a fragmentary top plan view of the apparatus of FIG. 1 at the completion of the U-bolt bending operation.

FIG. 3 is a fragmentary vertical sectional view taken in the direction of the arrows 3—3 of FIG. 1.

FIG. 4 is a fragmentary bottom plan view of the apparatus in the initial or starting position shown in FIG. 1 and FIG. 3.

Figure 5:
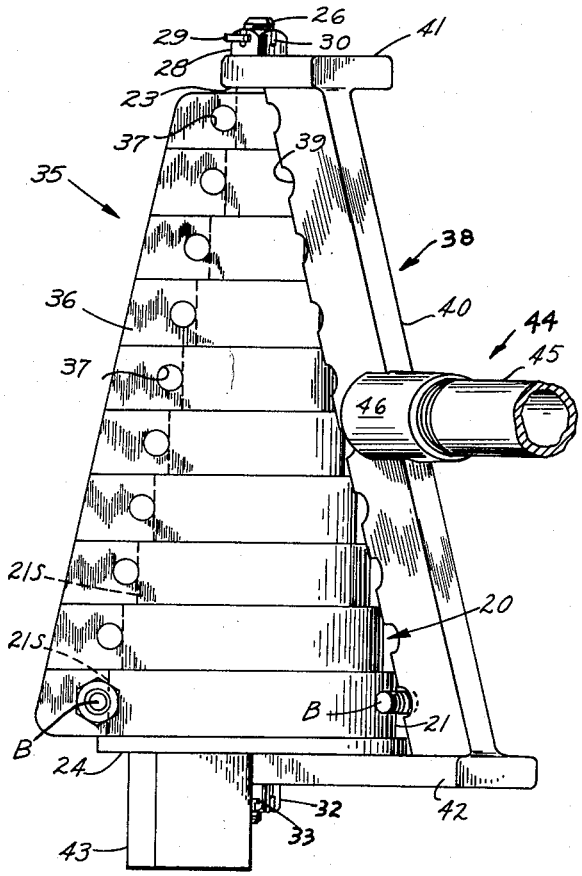
FIG. 5 is a view taken in the direction of the arrows 5—5 of FIG. 2.
Figure 6:
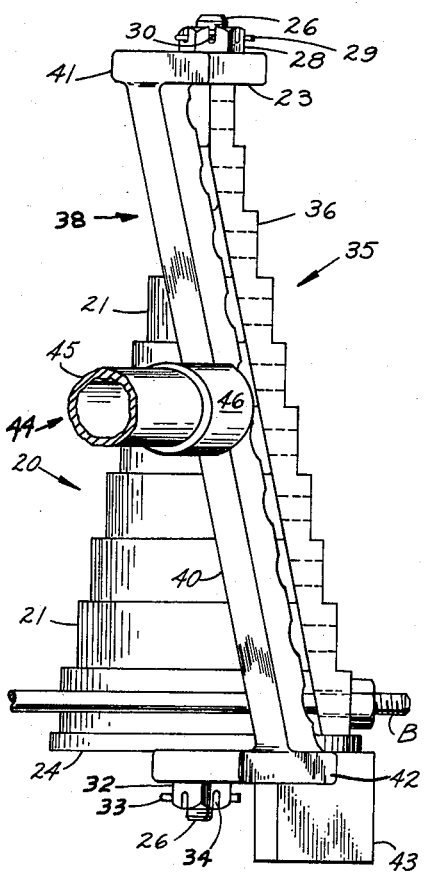
FIG. 6 is a view taken in the direction of the arrows 6—6 of FIG. 1.

Referring to FIGS. 1–7 for exemplary purposes, one illustrative embodiment of the invention takes a typical exemplary form wherein it comprises a longitudinal bending form or mandrel, indicated generally at 20, having a plurality of arcuate exterior bending form or mandrel portions 21 around which a bolt (which shall mean any longitudinal member, such as a piece of rod stock, threaded or unthreaded) is adapted to be bent. It should be noted that each of the curved exterior bending form or mandrel portions 21 has a different radius of curvature symmetrically centered on an imaginary pivotal axis of revolution, indicated at 22, passing symmetrically centrally from a top 23 to the bottom 24 of the complete bending form or mandrel 20. It should be noted that the mandrel 20 has longitudinally extending therethrough an aperture 25 which is concentric with respect to the pivotal axis of revolution 22 and which carries longitudinally extending therethrough a pivot pin 26 (taking the form of a bolt shaft in the example illustrated) which is threaded at the top, as indicated at 27, and which carries a castellated interiorly threaded nut 28 and locking pin 29 cooperable with any of the nut slots 30. The lower end of the shaft 26 is also threaded, as indicated at 31, and carries a castellated interiorly threaded nut 32 and locking pin 33 cooperable with any of the nut slots 34. This provides means for retaining the shaft or pivot pin 26 with respect to the mandrel 20, although other, and possibly integral, structures are also intended to be included and comprehended herein.

The bending form or mandrel 20 is provided with first bolt-engaging means, which, in the specific nonlimiting form shown in FIGS. 1–7, comprises bolt-holding means, one form of which is indicated generally at 35, for holding a portion of one or more bolts B (which shall also mean one or more longitudinal members such as pieces of rod stock which are to be formed into a U-bolt) adjacent to a starting part 21S of any particular one of the curved exterior bending form or mandrel portions 21 of the bending form or mandrel 20. In the particular form of the invention illustrated for exemplary purposes, the bolt holding means 35 comprises a longitudinal member 36 rigidly fastened along similar edge portions of each of the arcuate bending form or mandrel portions 21 and each provided with an aperture 37 slightly oversized with respect to the size of bolt B which is to be held thereby during a U-bolt bending operation.

The invention also includes second bolt-engaging means, which, in the specific non-limiting form shown in FIGS. 1–7, comprises moving apertured bending means, one exemplary embodiment of which is indicated generally at 38, adapted to receive a portion of a bolt B (which shall also mean any longitudinal member, such as rod stock, either threaded or unthreaded) whereby to bend it around any one of the curved exterior bending form or mandrel portions 21 of the bending form or mandrel 20 into substantially U-shaped configuration. The use of the word "moving" in connection with the bending means indicated generally at 38 refers to the fact that it moves with respect to the bolt B encompassed between the grooved or half-round portions 39 of the bending means 38 during a U-bolt bending operation. In the specific example illustrated, the moving apertured bending means, indicated generally at 38, comprises a bar 40 connected by linkage members 41 at the top and 42 at the bottom for pivotal rotation around the pivot pin or bolt shaft 26 whereby to cause the entire moving apertured bending means 38, during relative movement thereof with respect to the bending form or mandrel 20, to sweep around each of the arcuate bending form or mandrel portions 21 with the grooved portions 39 in horizontal opposition to the portions 21 and engaging opposite convex sides of a bolt (which shall also mean any longitudinal member, threaded or unthreaded) as indicated at B, whereby to bend it into substantially U-shaped configuration, as best shown in FIG. 2.

In the particular form of the invention illustrated, this is best accomplished by rigidly mounting the mounting means 43 in a vise, or the like, or other auxiliary holder, after which a piece of rod stock, threaded or otherwise, such as is indicated at B in FIG. 1, is inserted through a particular one of the apertures 37 which lies in the same horizontal plane as a bending form or mandrel portion 21 which has the diameter around which the U-bolt is to be bent, and then the remaining projecting portion of the rod stock B is positioned between the opposed starting portion 21S and groove 39, after which the moving apertured bending means 38 is swung through 180 degrees or slightly more by applying force to the handle means, indicated generally at 44. This causes the moving apertured bending means 38 to pivot around the vertical pivot pin 26, which causes the grooved portion 39 to slide along the rod stock B and bend same around the bending form or mandrel portion 21 into the U-shaped configuration best shown in FIG. 2.

It will readily be understood that any of ten different sizes of U-bolts, with or without different thicknesses of rod stock, may be formed with the U-bolt bender illustrated in the drawings. However, the number of different sizes can be varied at will by varying the number of bending form or mandrel portions 21 and correspondingly varying the number of grooves 39.

It should be noted that, in the particular form of the invention illustrated, the handle means indicated generally at 44, comprises a first element 45 adapted to be threaded into a threaded receiver 46, which is fixedly attached to the bar 40. The handle means 44 also includes a second handle member 47 adapted to be threadedly engaged as indicated at 48 with respect to the first handle portion 45, thus providing a disassembleable handle which is convenient for purposes of ready portability.

Figures 7, 8:
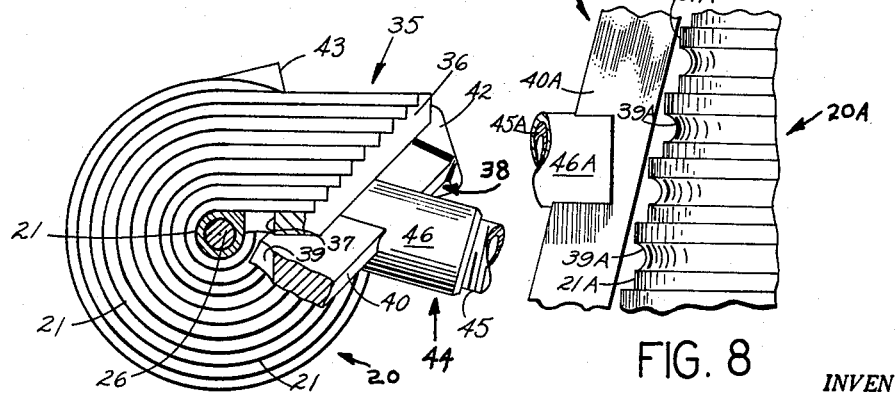
FIG. 7 is a view taken in the direction of the arrows 7—7 of FIG. 3.
FIG. 8 is a fragmentary view showing a slightly modified bending means and cooperating bending form or mandrel wherein the position of the multiple stepped grooves is reversed—now being carried by each curved exterior portion of the bending form or mandrel rather than by the arcuately movable bending means as was the case in the first form of the invention illustrated in FIGS. 1–7.

FIG. 8 illustrates a slight modification of the invention wherein corresponding parts are indicated by corresponding reference numerals, followed by the letter "A," however. In this modification, the bar 40A does not have grooves corresponding to those shown at 39 in the first form of the invention as being carried by the bar 40. Instead, in this modified form, the grooves 39A are carried by the opposed bending form or mandrel portions 21A, while the opposed inner portions of the bar 40A are relatively smooth. This provides an arrangement well adapted to bend a bolt into U-bolt configuration in a manner very similar to that described in connection with the first form of the invention. The remainder of this modified form of the invention is substantially identical to the first form previously described and, therefore, no further detailed description is thought necessary.

It should be noted that the upper five bending form or mandrel portions 21 shown in the first form of the invention progressively downwardly increase in diameter by one-quarter of an inch steps, while the lower five such bending form or mandrel portions 21 increase progressively downwardly in diameter in half-inch steps. However, this is illustrative only and is not intended to limit the scope of the invention which may include any number of such bending form or mandrel portions with any desired diametrical intervals between successive steps thereof.

It should also be noted that it is not necessary that the bar 40 be rotated while the mandrel 20 remains stationary. In certain forms of the invention, this relationship may be reversed and the mounting means 43 may be effectively fixed with respect to the bar 40 or the coupling member 42, and the handle 44 may be effectively connected with respect to the mandrel 20, which would be rotated with respect to the fixed bar 40. In other words, the only requirement is that the bending means 38 and the bending form or mandrel 20 be relatively rotatable with respect to each other—it is unimportant which of the members is fixed and which moves—and all such arrangements are intended to be included and comprehended herein.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A U-bolt bender, comprising: a longitudinal bending form having at least one arcuate exterior bending form portion and having a longitudinal pivot pin effectively defining an axis of revolution at the center of curvature of the arcuate exterior bending form portion; effectively apertured first bolt-engaging means for holding one leg portion of a bolt displaced longitudinally from a middle portion of the bolt which is to be bent into a substantially U-shaped configuration, said first bolt-engaging means being positioned in a starting position relative to said arcuate exterior bending form portion in a location radially displaced outwardly from said arcuate exterior bending form portion by a distance which is a function of the bolt which is to be bent and displaced longitudinally along a tangent from said radially outwardly displaced location a distance which is a function of the effective radius of curvature of said arcuate exterior bending form portion, said first bolt-engaging means being fixedly attachedly cooperable with respect to said one leg portion of said bolt, and bending means provided with effectively apertured second bolt-engaging means for engaging the bolt and bending it around the arcuate exterior portion of the bending form into substantially U-shaped configuration in response to relative rotation of, and arcuate displacement of, said first and second bolt-engaging means, said second bolt-engaging means being positioned radially outwardly spaced from said arcuate exterior bending form portion and, being controllably positionable in an initial starting location immediately circumferentially adjacent to, and on the front side of, said first bolt-engaging means in said starting position, with said second bolt-engaging means being similarly radially displaced outwardly from said arcuate exterior bending form and being displaced longitudinally along said tangent from said radially outwardly displaced location a distance which is a function of the effective radius of curvature of said arcuate exterior bending form portion, said second bolt-engaging means being pivotally connected with respect to said longitudinal pivot pin for relative rotation of said bending form and said bending means with respect to each other, whereby to forcibly arcuately separate said first and second bolt-engaging means to any desired degree and to correspondingly arcuately bend the middle portion of the bolt engaged by said first and second bolt-engaging means around the part of said arcuate exterior portion of the bending form extending arcuately between said first and second bolt-engaging means.

2. Apparatus of the character defined in claim 1, wherein one of said first and second bolt-engaging means comprises locked-engagement bolt-holding means for fixedly holding said one leg portion of said bolt, and the other of said first and second bolt-engaging means comprises sliding-engagement means for exteriorly forcibly sliding along and arcuately bending said middle portion of said bolt having said one leg portion thereof fixedly held by said locked-engagement bolt-holding means.

3. Apparatus of the character defined in claim 1, including means for forcibly arcuately rotating said bending means and said bending form with respect to each other whereby to correspondingly arcuately move the first and second bolt-engaging means into arcuately spacedapart positions along a middle portion of an engaged bolt.

4. Apparatus of the character defined in claim 1, wherein the longitudinal bending form includes a plurality of said arcuate exterior bending form portions longitudinally spaced along the bending form, each having a different radius of curvature centered on the common longitudinal pivot pin and the axis of revolution defined thereby, and including a corresponding plurality of pairs of said first and second bolt-engaging means, with the first and second bolt-engaging means of each pair thereof having substantially equal radii differing from those of other pairs of said first and second bolt-engaging means and related to each other in a manner corresponding to the different radii of curvature of the corresponding different arcuate exterior bending form portions, each of said first bolt-engaging means being positioned in a different one of a plurality of said starting positions, each being radially outwardly displaced from the corresponding arcuate exterior bending form portion a distance which is a function of the corresponding bolt which is to be bent therearound and then being tangentially longitudinally displaced a different distance which is a function of the radius of curvature of the corresponding one of said exterior bending form portions, and each different one of said second bolt-engaging means being movable into a starting position arcuately forwardly closely adjacent to the corresponding one of said first bolt-engaging means having a different effective radius of curvature whereby to provide means for bending a plurality of said bolts into U-bolt configurations in any of a selected range of interior sizes.

5. A U-bolt bender, comprising: a longitudinal bending form having at least one arcuate exterior bending form portion and having a longitudinal pivot pin effectively defining an axis of revolution at the center of curvature of the arcuate exterior bending form portion; effectively apertured first bolt-engaging means for holding one leg portion of a bolt displaced longitudinally from a middle portion of the bolt which is to be bent into a substantially U-shaped configuration, said first bolt-engaging means being positioned in a starting position relative to said arcuate exterior bending form portion in a location radially displaced outwardly from said arcuate exterior bending form portion by an average distance substantially equal to one-half of the diameter of the bolt which is to be bent and displaced longitudinally in a rearward direction along a tangent from said radially outwardly displaced location a distance which is a function of the effective radius of curvature of said arcuate exterior bending form portion, said first bolt-engaging means being fixedly attachedly cooperable with respect to said one leg portion of said bolt and bending means provided with effectively apertured second bolt-engaging means for engaging the bolt and bending it around the arcuate exterior portion of the bending form into substantially U-shaped configuration in response to relative rotation of, and arcuate displacement of, said first and second bolt-engaging means, said second bolt-engaging means being positioned radially outwardly spaced from said arcuate exterior bending form portion and, being controllably positionable in an initial starting location immediately circumferentially adjacent to, and on the front side of, said first bolt-engaging means in said starting position, with said second bolt-engaging means being similarly radially displaced outwardly from said arcuate exterior bending form portion by said average distance substantially equal to one-half of the diameter of the bolt which is to be bent and being displaced longitudinally in said rearward direction along said tangent from said radially outwardly displaced location a distance which is a function of the effective radius of curvature of said arcuate exterior bending form portion and which is slightly less than the longitudinal rearward displacement of said first bolt-engaging means, said second bolt-engaging means being pivotally connected to said longitudinal pivot pin for rotation of said bending means around said bending form, whereby to forcibly arcuately separate said first and second bolt-engaging means to any desired degree and to correspondingly arcuately bend the middle portion of the bolt engaged by said first and second bolt-engaging means around the part of said arcuate exterior portion of the bending form extending arcuately between said first and second bolt-engaging means, said first bolt-engaging means comprising locked-engagement, bolt-holding means for fixedly holding said one leg portion of said bolt, and said second bolt-engaging means comprising sliding-engagement means for exteriorly forcibly sliding along and arcuately inwardly bending the middle portion of the bolt having said one leg portion thereof fixedly held by said locked-engagement bolt-holding means.

6. Apparatus of the character defined in claim 5, wherein the longitudinal bending form includes a plurality of said arcuate exterior bending form portions longitudinally spaced along the bending form, each having a different radius of curvature centered on the common longitudinal pivot pin and the axis of revolution defined thereby, and including a corresponding plurality of pairs of said first and second bolt-engaging means, with the first and second bolt-engaging means of each pair thereof having substantially equal radii differing from those of other pairs of said first and second bolt-engaging means and related to each other in a manner corresponding to the different radii of curvature of the corresponding different arcuate exterior bending form portions, each of said first bolt-engaging means being positioned in a different one of a plurality of said starting positions, each being radially outwardly displaced from the corresponding arcuate exterior bending form portion an average distance substantially equal to one-half of the diameter of the corresponding bolt which is to be bent therearound and then being tangentially longitudinally rearwardly displaced a different distance which is a function of the radius of curvature of the corresponding one of said exterior bending form portions, and each different one of said second bolt-engaging means being movable into a starting position arcuately forwardly closely adjacent to a corresponding one of said first bolt-engaging means having a different effective radius of curvature whereby to provide means for bending a plurality of said bolts into U-bolt configurations; in any of a selected range of interior sizes said bending means extending along the side of the plurality of arcuate exterior bending form portions of different radii of curvature between opposite ends thereof and in a direction angularly related to the axis of revolution defined by said longitudinal pivot pin whereby to position different ones of said second bolt-engaging means adjacent to the corresponding arcuate exterior portions of the bending form at correspondingly circularly angularly displaced initial starting locations.

7. Apparatus of the character defined in claim 6 wherein each of said arcuate exterior bending form portions of different radii of curvature is provided with outwardly open, concavely grooved means for receiving engagement with the corresponding inner convex side of a corresponding bolt in direct opposition to the corresponding second bolt-engaging means.

8. Apparatus of the character defined in claim 6 wherein said bending means is provided with outwardly projecting handle means for directly applying rotary bending force thereto for movement thereof around said axis of revolution defined by said longitudinal pivot pin; said bending form carrying the plurality of different arcuate exterior bending form portions of different radii of curvature being provided with mounting means fixedly attached thereto for rigidly mounting same in an auxiliary holder.

9. Apparatus of the character defined in claim 6 wherein each of said sliding-engagement means is provided with inwardly open effectively semicircular concavely grooved means positioned for mating sliding engagement with the corresponding outer convex semicircular surface of the middle portion of the corresponding bolt which is to be bent, each of said concavely grooved means being radially outwardly spaced from the corresponding arcuate exterior bending form portion by a distance comprising the difference in radius between said concavely grooved means when in said radially outwardly displaced and rearwardly longitudinally tangentially displaced initial starting location and the radius of said corresponding arcuate exterior bending form portion.

References Cited in the file of this patent

UNITED STATES PATENTS

| | | |
|---|---|---|
| 1,899,281 | Lidseen | Feb. 28, 1933 |

FOREIGN PATENTS

| | | |
|---|---|---|
| 470,314 | Great Britain | Aug. 12, 1937 |
| 1,121,907 | France | May 14, 1956 |